US011967283B1

(12) United States Patent
Zhou et al.

(10) Patent No.: US 11,967,283 B1
(45) Date of Patent: Apr. 23, 2024

(54) PIXEL DRIVE CIRCUIT AND DISPLAY PANEL

(71) Applicant: HKC CORPORATION LIMITED, Shenzhen (CN)

(72) Inventors: Renjie Zhou, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/359,218

(22) Filed: Jul. 26, 2023

(30) Foreign Application Priority Data

Nov. 9, 2022 (CN) ......................... 202211398431.9

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2300/0842* (2013.01); *G09G 2320/0233* (2013.01)

(58) Field of Classification Search
CPC ............. G06F 3/03543; G06F 3/04812; G06F 3/0482; G06F 3/04845; G06F 2203/04803; G06T 11/00; G06T 2200/24; G06T 2210/41; G16H 30/20; G16H 30/40; G16H 40/63; G16H 50/20
See application file for complete search history.

(56) References Cited

U.S. PATENT DOCUMENTS

2011/0115772 A1 5/2011 Chung et al.
2020/0302859 A1* 9/2020 Wang .................. G09G 3/3233
2021/0407401 A1* 12/2021 Chen .................... G09G 3/3233
(Continued)

FOREIGN PATENT DOCUMENTS

CN 110782842 A 2/2020
CN 110890055 A 3/2020
CN 113450695 A 9/2021
(Continued)

OTHER PUBLICATIONS

Office Action dated Dec. 15, 2022, in corresponding Chinese Application No. 202211398431.9, 12 pages.
(Continued)

*Primary Examiner* — Stacy Khoo
(74) *Attorney, Agent, or Firm* — Maier & Maier, PLLC

(57) ABSTRACT

A pixel drive circuit, including a data input circuit, an energy storage circuit, a light-emitting control circuit, a first switch circuit, a second switch circuit and a third switch circuit. An end of the first switch circuit is connected with a control end of the light-emitting control circuit, and another end of the first switch circuit is connected with an input of the light-emitting control circuit that is connected to a power supply. An end of the second switch circuit is connected with an output of the data input circuit, and another end of the second switch circuit is grounded, and an output of the light-emitting control circuit is connected to an anode of a light-emitting device. The first switch circuit and the second switch circuit are switched on in a reset phase, and the third switch circuit is switched on in a light-emitting phase.

14 Claims, 3 Drawing Sheets

(56) References Cited

U.S. PATENT DOCUMENTS

2023/0103841 A1* 4/2023 Park ....................... H10K 59/65
345/211

FOREIGN PATENT DOCUMENTS

| | | | | |
|---|---|---|---|---|
| CN | 114038405 | A | | 2/2022 |
| CN | 114335133 | A | * | 4/2022 |
| KR | 20110053708 | A | | 5/2011 |
| WO | 2016145693 | A1 | | 9/2016 |

OTHER PUBLICATIONS

Search Report dated Dec. 1, 2022, in corresponding Chinese Application No. 202211398431.9, 5 pages.
Notification to Grant dated Feb. 16, 2023, in corresponding Chinese Application No. 202211398431.9, 3 pages.
Office Action dated Jan. 11, 2023, in corresponding Chinese Application No. 202211398431.9, 14 pages.

* cited by examiner

PIXEL DRIVE CIRCUIT AND DISPLAY PANEL

CROSS-REFERENCE TO RELATED APPLICATION

Pursuant to 35 U.S.C. § 119 and the Paris Convention, this application claims the benefit of Chinese Patent Application No. 202211398431.9 filed on Nov. 9, 2022, the content of which is incorporated herein by reference.

TECHNICAL FIELD

The present application relates to the field of display technology, and in particular, to a pixel drive circuit and a display panel.

BACKGROUND

The statements provided herein are merely background information related to the present application, and do not necessarily constitute any prior arts. Active-matrix organic light emitting diode (AMOLED) display devices are more and more widely used in TVs, mobile phones and other products due to their characteristics of high density, wide view angle, fast response, and low power consumption, etc.

Among them, the OLED is a current-driven device, and a driving current is provided through the OLED drive circuit during operation. When a current flows through the OLED, the OLED emits light, and the luminous brightness is determined by the current flowing through the OLED.

Due to a difference in the distance between each OLED and a power supply in a display device, different voltage drops will occur when the power supply voltage reaches each OLED through lines of different lengths, resulting in differences in the driving current provided by the power supply to each OLED, which affects a uniformity of brightness of a display screen.

SUMMARY

In view of this, the present application provides a pixel drive circuit and a display panel, to reduce the difference in the driving current of each OLED caused by the difference in the distance between the power supply and each OLED, and improve the uniformity of the brightness of the display screen.

To achieve the above objective, in accordance with a first aspect, an embodiment of the present application provides a pixel drive circuit, which includes: a data input circuit, an energy storage circuit, a light-emitting control circuit, a first switch circuit, a second switch circuit and a third switch circuit. The data input circuit is in electrical connection with a control end of the light-emitting control circuit through the energy storage circuit, the data input circuit is configured to output a data voltage to the light-emitting control circuit, and the energy storage circuit is configured to store electric energy.

One end of the first switch circuit is in electrical connection with the control end of the light-emitting control circuit, and the other end of the first switch circuit is in electrical connection with an input of the light-emitting control circuit.

One end of the second switch circuit is in electrical connection with an output of the data input circuit, and the other end of the second switch circuit is grounded.

The input of the light-emitting control circuit is in electrical connection with a first power supply, an output of the light-emitting control circuit is in electrical connection with an anode of a light-emitting device through the third switch circuit, and the light-emitting control circuit is configured to output a driving current to the light-emitting device. A cathode of the light-emitting device is in electrical connection with a second power supply.

The first switch circuit and the second switch circuit are switched on in a reset phase, and are switched off in a writing phase and a light-emitting phase. The third switch circuit is switched off in the reset phase and the writing phase, and is switched on in the light-emitting phase.

As an optional implementation of the embodiment of the present application, the first switch circuit includes a first switch and a first scan line. A first electrode of the first switch is in electrical connection with the control end of the light-emitting control circuit, a second electrode of the first switch is in electrical connection with the input of the light-emitting control circuit, and a control electrode of the first switch is in electrical connection with an output of the first scan line.

As an optional implementation of the embodiment of the present application, the first switch is a P-channel metal oxide semiconductor (PMOS) transistor, the first scan line outputs a low-potential signal in the reset phase, and outputs a high-potential signal in the writing phase and the light-emitting phase.

As an optional implementation of the embodiment of the present application, the second switch circuit includes a second switch and a second scan line. A first electrode of the second switch is in electrical connection with the output of the data input circuit, a second electrode of the second switch is grounded, and a control electrode of the second switch is in electrical connection with an output of the second scan line.

As an optional implementation of the embodiment of the present application, the third switch circuit includes a third switch and a light-emitting signal line. A first electrode of the third switch is in electrical connection with the output of the light-emitting control circuit, a second electrode of the third switch is in electrical connection with the anode of the light-emitting device, and a control electrode of the third switch is in electrical connection with an output of the light-emitting signal line.

As an optional implementation of the embodiment of the present application, the pixel drive circuit also includes a fourth switch circuit, and both the first switch circuit and the light-emitting control circuit is in electrical connection with the first power supply through the fourth switch circuit.

As an optional implementation of the embodiment of the present application, the fourth switch circuit includes: a fourth switch and a third scan line. A first electrode of the fourth switch is in electrical connection with the first power supply, a second electrode of the fourth switch is in electrical connection with the input of the light-emitting control circuit, and a control electrode of the fourth switch is in electrical connection with an output of the third scan line.

As an optional implementation of the embodiment of the present application, the energy storage circuit includes a capacitor.

As an optional implementation of the embodiment of the present application, the data input circuit includes a fifth switch, a data line and a fourth scan line. A first electrode of the fifth switch is in electrical connection with an output of the data line, a second electrode of the fifth switch is in electrical connection with the control end of the light-emitting control circuit through the energy storage circuit, and a control electrode of the fifth switch is in electrical connection with an output of the fourth scan line.

In accordance with a second aspect, an embodiment of the present application provides a display panel, including a plurality of pixel units, each pixel unit includes the light-emitting device and the pixel drive circuit as described in the first aspect or any one of the first aspect.

The pixel drive circuit or the display panel provided in the embodiment of the present application includes: a data input circuit, an energy storage circuit, a light-emitting control circuit, a first switch circuit, a second switch circuit and a third switch circuit. The data input circuit is electrically connected to a control end of the light-emitting control circuit through the energy storage circuit. The data input circuit is configured to output a data voltage to the light-emitting control circuit, and the energy storage circuit is configured to store electric energy. One end of the first switch circuit is in electrical connection with the control end of the light-emitting control circuit, and the other end of the first switch circuit is in electrical connection with an input of the light-emitting control circuit. One end of the second switch circuit is in electrical connection with an output of the data input circuit, and the other end of the second switch circuit is grounded. The input of the light-emitting control circuit is in electrical connection with a first power supply, an output of the light-emitting control circuit is in electrical connection with an anode of a light-emitting device through the third switch circuit, and the light-emitting control circuit is configured to output the driving current to the light-emitting device in a light-emitting phase. A cathode of the light-emitting device is in electrical connection with a second power supply. The first switch circuit and the second switch circuit are switched on in the reset phase, and are switched off in the writing phase and the light-emitting phase. The third switch circuit is switched off in the reset phase and the writing phase, and is switched on in the light-emitting phase. In the above technical solutions, in the reset phase, the first switch circuit and the second switch circuit are switched on, a path is formed among the first power supply, the first switch circuit, the energy storage circuit and the second switch circuit, the energy storage circuit is charged, and a voltage at the control end of the light-emitting control circuit is boosted to the voltage of the first power supply, which can reduce a voltage difference between the control end and the input of the light-emitting control circuit (that is, the gate and source of the drive thin-film transistor), thereby reducing the probability of afterimages on the display screen caused by the parasitic capacitance between the control end and the input of the light-emitting control circuit. In the writing phase, the energy storage circuit is charged by the data input circuit, and the voltage at the control end of the light-emitting control circuit is boosted to a sum of the data voltage and the voltage of the first power supply, in this way, in the light-emitting phase, the driving current of the light-emitting device is enabled to be controlled according to the data voltage, so that the driving current of the light-emitting device is independent from the voltage of the first power supply, thereby reducing the difference in the driving current of each OLED caused by the distance difference between the power supply and each OLED, which thus can improve the uniformity of the brightness of the display screen.

DETAILED DESCRIPTION

Embodiments of the present application are described below with reference to the drawings in the embodiments of the present application. The terms used in implementations of the embodiments of the present application are only used to explain the specific embodiments of the present application, and are not intended to limit the present application. The following specific embodiments may be combined with each other, and the same or similar concepts or processes may not be repeated in some embodiments.

The light-emitting device in the embodiments of the present application may be any one of an OLED, an inorganic light-emitting diode (LED), a quantum dot light-emitting diode (QLED) and a submillimeter light-emitting diode (Mini Light Emitting Diodes, Mini LED). In the following embodiments, the light-emitting device is an OLED as an example for exemplary description.

Figure 1:
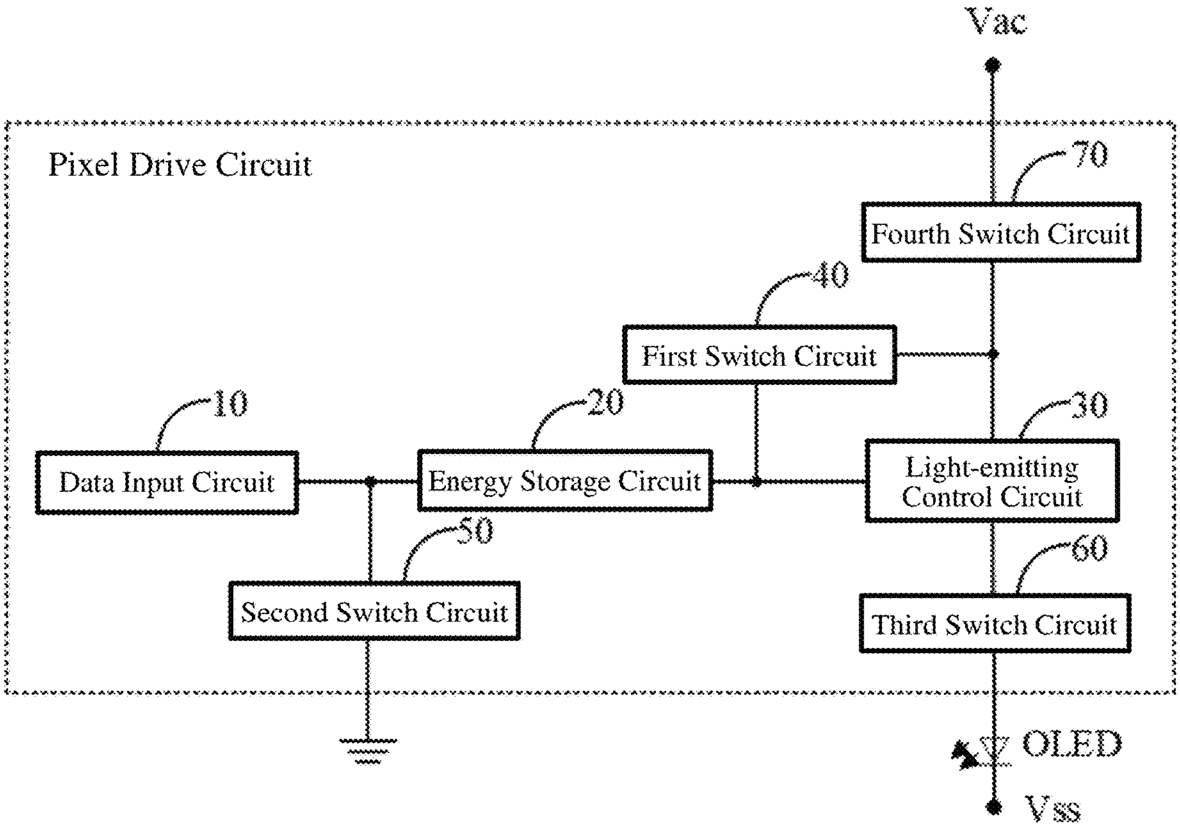
FIG. 1 is a schematic structural diagram of any pixel unit in a display panel in accordance with an embodiment of the present application.

The display panel provided by the embodiment of the present application may include a plurality of pixel units. FIG. 1 is a schematic structural diagram of any pixel unit in the display panel in accordance with an embodiment of the present application. As shown in FIG. 1, the pixel unit may include: a first power supply Vac, a second power supply Vss, a pixel drive circuit and an OLED.

The first power supply Vac may output a high-potential voltage, and correspondingly, the second power supply Vss may output a low-potential voltage.

The pixel drive circuit may include: a data input circuit 10, an energy storage circuit 20, a light-emitting control circuit 30, a first switch circuit 40, a second switch circuit 50 and a third switch circuit 60.

The data input circuit 10 is in electrical connection with a control end of the light-emitting control circuit 30 through the energy storage circuit 20, the data input circuit 10 is configured to output a data voltage to the light-emitting control circuit 30, and the energy storage circuit 20 is configured to store electric energy. One end of the first switch circuit 40 is in electrical connection with the control end of the light-emitting control circuit 30, and the other end of the first switch circuit 40 is in electrical connection with an input of the light-emitting control circuit 30.

One end of the second switch circuit 50 is in electrical connection with an output of the data input circuit 10, and the other end of the second switch circuit 50 is grounded.

An input of the light-emitting control circuit 30 is in electrical connection with the first power supply Vac, the output of the light-emitting control circuit 30 is in electrical connection with an anode of the OLED through the third switch circuit 60, and the light-emitting control circuit 30 is configured to output a driving current to the OLED in a light-emitting phase. A cathode of the OLED is in electrical connection with the second power source Vss.

In a reset phase, the first switch circuit 40 and the second switch circuit 50 are switched on, a third switch T3 is switched off, and a path is formed among the first power supply Vac, the first switch circuit 40, the energy storage circuit 20 and the second switch circuit 50. The energy storage circuit 20 is charged, and a voltage at the control end of the light-emitting control circuit 30 is boosted to a voltage of the first power supply Vac, which can reduce a voltage difference between the control end and the input of the light-emitting control circuit 30, thereby reducing a probability of afterimages on the display screen caused by the parasitic capacitance C1 between the control end and the input of the light-emitting control circuit 30. In a writing phase, the first switch circuit 40, the second switch circuit 50 and the third switch circuit 60 are all switched off, and the energy storage circuit 20 is charged by the data input circuit 10, and the voltage at the control end of the light-emitting control circuit 30 is boosted to a sum of the data voltage and the voltage of the first power supply Vac. Thus, in a light-emitting phase, the first switch circuit 40 and the second switch circuit 50 remain switched-off, and the third switch T3 is switched on, the driving current of the OLED is controlled by the data voltage, and the driving current of the OLED is independent from the voltage of the first power supply Vac, so that the difference in driving current of each OLED caused by the distance difference between the first power supply Vac and different OLEDs can be reduced, thereby improving the uniformity of the brightness of the display screen.

In another embodiment of the present application, the light-emitting control circuit 30 may further include a fourth switch circuit 70. Both the first switch circuit 40 and the light-emitting control circuit 30 are electrically connected to the first power supply Vac through the fourth switch circuit 70. The fourth switch circuit 70 may be switched off when the display screen is turned off, to reduce the probability that the light-emitting control circuit 30 is switched on again caused by the residual charge between the first power supply Vac and the light-emitting control circuit 30.

Figure 2:
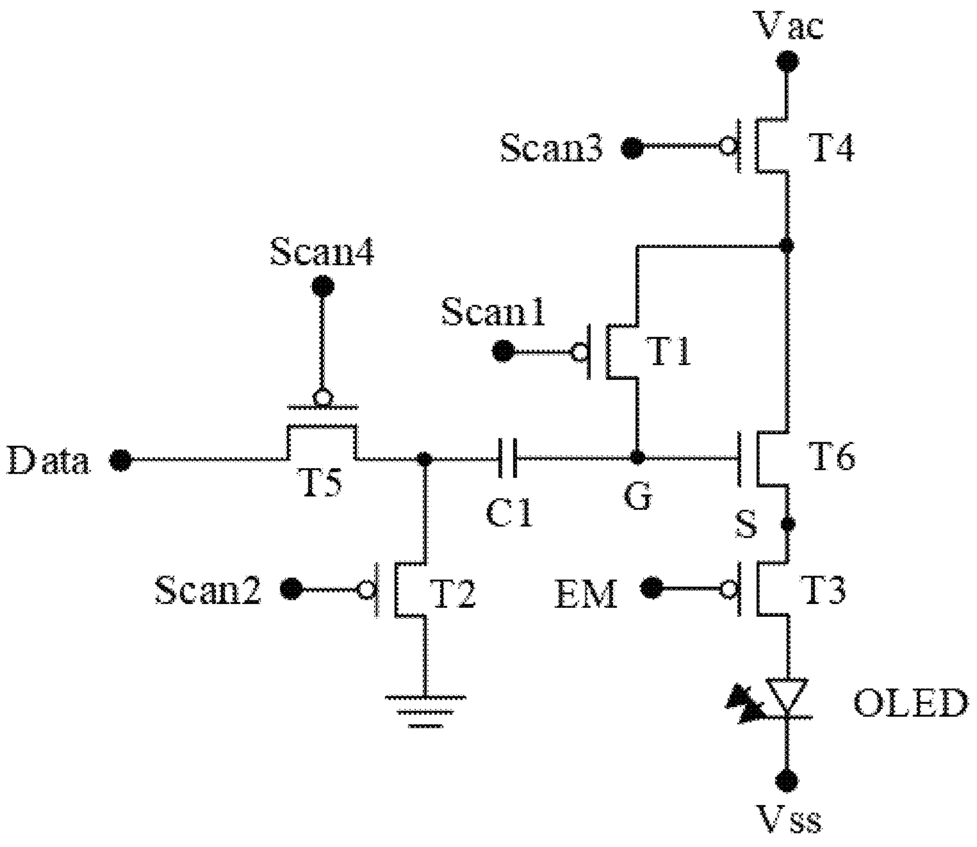
FIG. 2 is a schematic diagram of a circuit structure of a pixel drive circuit in FIG. 1.

FIG. 2 is a schematic diagram of a circuit structure of the pixel drive circuit in FIG. 1. As shown in FIG. 2, the first switch circuit 40 may include a first switch T1 and a first scan line Scan1. A first electrode of the first switch T1 is in electrical connection with the control end of the light-emitting control circuit 30, a second electrode of the first switch T1 is in electrical connection with the input of the light-emitting control circuit 30, and a control electrode of the first switch T1 is in electrical connection with an output of the first scan line Scan1.

The second switch circuit 50 may include a second switch T2 and a second scan line Scan2. A first electrode of the second switch T2 is in electrical connection with the output of the data input circuit 10, a second electrode of the second switch T2 is grounded, and a control electrode of the second switch T2 is in electrical connection with an output of the second scan line Scan2.

The third switch circuit 60 may include a third switch T3 and a light-emitting signal line EM. A first electrode of the third switch T3 is in electrical connection with the output of the light-emitting control circuit 30, a second electrode of the third switch T3 is in electrical connection with the anode of the OLED, and a control electrode of the third switch T3 is in electrical connection with an output of the light-emitting signal line EM.

The fourth switch circuit 70 may include a fourth switch T4 and a third scan line Scan3. A first electrode of the fourth switch T4 is in electrical connection with the first power supply Vac, a second electrode of the fourth switch T4 is in electrical connection with the input of the light-emitting control circuit 30, and a control electrode of the fourth switch T4 is in electrical connection with an output of the third scan line Scan3.

The data input circuit 10 may include a fifth switch T5, a data line Data and a fourth scan line Scan4. A first electrode of the fifth switch T5 is in electrical connection with an output of the data line Data, and a second electrode of the fifth switch T5 is electrically connected to the control end of the light-emitting control circuit 30 through the energy storage circuit 20, and a control electrode of the fifth switch T5 is in electrical connection with an output of the fourth scan line Scan4.

The first switch T1, the second switch T2, the third switch T3, the fourth switch T4 and the fifth switch T5 may be P-channel metal oxide semiconductor (PMOS) transistors or N-channel metal oxide semiconductor (NMOS) transistors. When these switches are PMOS transistors, the first electrode of each of these switches is the source, the second electrode of each of these switches is the drain, and the control electrode of each of these switches is the gate. When the switches are NMOS transistors, the first electrode of each of these switches is the drain, the second electrode of each of these switches is the source, and the control electrode of each of these switches is the gate. In the following, the above-mentioned switches are all PMOS transistors as an example for exemplary description of the embodiments.

The light-emitting control circuit 30 may include a drive thin-film transistor T6. A first electrode of the drive thin-film transistor T6 is in electrical connection with the second electrode of the fourth switch T4, a second electrode of the drive thin-film transistor T6 is in electrical connection with the first electrode of the third switch T3, and a control electrode of the drive thin-film transistor T6 is in electrical connection with one end of the energy storage circuit 20.

The drive thin-film transistor T6 may be an NMOP transistor. Correspondingly, the first electrode of the drive thin-film transistor T6 is the drain, the second electrode is the source, and the control electrode is the gate.

The energy storage circuit 20 may include a capacitor C1, one end of the capacitor C1 is in electrical connection with the control electrode of the drive thin-film transistor T6, and the other end of the capacitor C1 is in electrical connection with the second electrode of the fifth switch T5.

Figure 3:
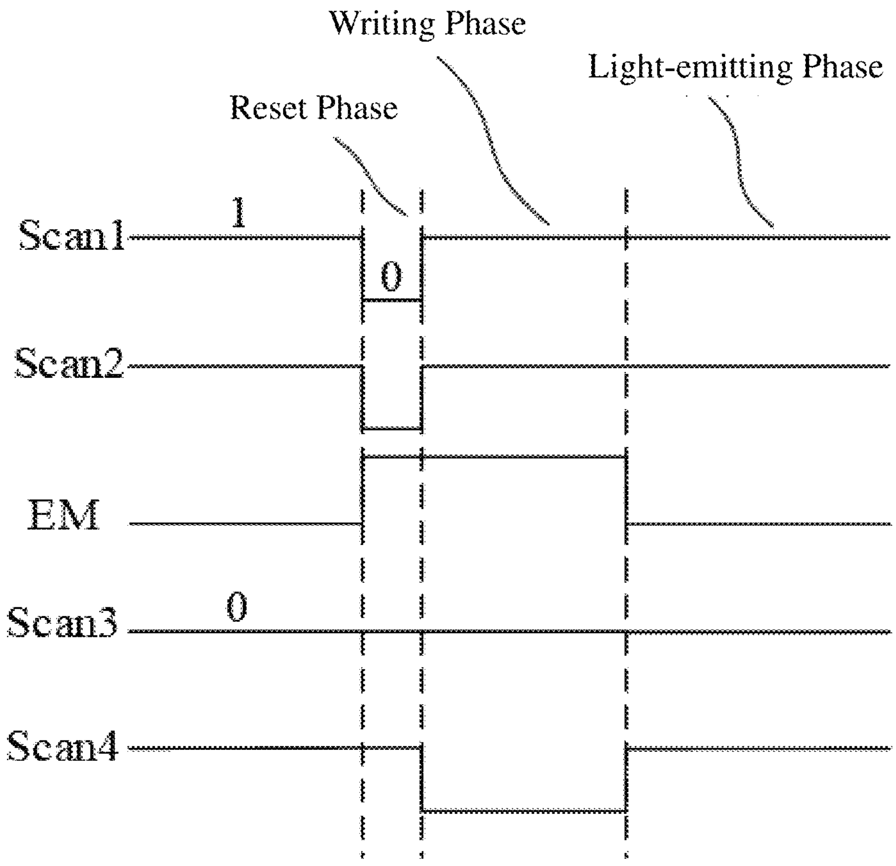
FIG. 3 is an operation timing-sequence diagram of the pixel drive circuit in accordance with an embodiment of the present application.

FIG. 3 is an operation time sequence diagram of the pixel drive circuit in accordance with an embodiment of the present application. As shown in FIG. 3, in the reset phase, a low-potential signal 0 is output form the first scan line Scan1, the second scan line Scan2 and the third scan line Scan3, the first switch T1, the second switch T2 and the fourth switch T4 are switched on. The first power supply Vac charges the capacitor C1, and a voltage at point G is boosted to an output voltage Vdd of the first power supply Vac. A high-potential signal 1 is output from the light-emitting signal line EM and the fourth scan line Scan4, and the third switch T3, the fifth switch T5 and the drive thin-film transistor T6 are switched off.

In the writing phase, the first scan line Scant, the second scan line Scan2 and the light-emitting signal line EM output a high-potential signal 1, the third scan line Scan3 and the fourth scan line Scan4 output a low-potential signal 0, the fourth switch T4 and the fifth switch T5 are switched on, the other switches are switched off, and the data line Data continues to charge the capacitor C1. At this time, the voltage at point G is that VG=Vdata+Vdd, which drives the drive thin-film transistor T6 to be switched on, and the voltage at point S is boosted to Vdd.

In the light-emitting phase, the first scan line Scant, the second scan line Scan2 and the fourth scan line Scan4 output a high-potential signal 1, the third scan line Scan3 and the light-emitting signal line EM output a low-potential signal 0, the third switch T3, the fourth switch T4 and the drive thin-film transistor T6 are switched on, and the OLED emits light.

The driving current of OLED may be determined according to the following formula:

$$I_{OLED}=1/2\mu_n C_{ox} W/L(Vgs-Vth)^2$$

Where, $I_{OLED}$ is the driving current of the OLED, $\mu_n$ is an electron mobility of the drive thin-film transistor T6, $C_{ox}$ is a capacitance per unit area of a gate oxide layer of the drive thin-film transistor T6, W/L is a width-to-length ratio of the drive thin-film transistor T6, and Vgs is a voltage at the gate of the drive thin-film transistor T6 with respect to the source of the drive thin-film transistor T6, Vth is a threshold voltage of the drive thin-film transistor.

The gate-source voltage of the drive thin-film transistor is that Vgs=VG-VS=(Vdata+Vdd)−Vdd=Vdata. According to the calculation formula of OLED driving current, the following formula is determined that:

$$I_{OLED}=1/2\mu_n C_{ox} W/L(\text{Vdata}-Vth)^2$$

According to the above formula, in the pixel drive circuit provided by the present application, the driving current of the OLED is only related to the data voltage Vdata and the threshold voltage Vth of the drive thin-film transistor T6, and is independent from the voltage Vdd of the first power supply Vac, thereby reducing the voltage of the first power supply Vac. The difference in the driving current of each OLED caused by the difference in the distance between Vac and each OLED is reduced, and thus the uniformity of the brightness of the display screen is improved.

It can be understood that the circuit modules illustrated in the embodiments of the present application do not constitute a specific limitation on the pixel drive circuit. In other embodiments of the present application, the pixel drive circuit may include more or fewer circuit modules than shown in the figure, or some circuit modules are combined, or some circuit modules are split. Each circuit module may include more or fewer devices than shown in the drawings. The illustrated circuit modules may be implemented in hardware, software or a combination of software and hardware.

The pixel drive circuit or the display panel provided in the embodiment of the present application includes: a data input circuit, an energy storage circuit, a light-emitting control circuit, a first switch circuit, a second switch circuit and a third switch circuit. The data input circuit is electrically connected to a control end of the light-emitting control circuit through the energy storage circuit. The data input circuit is configured to output a data voltage to the light-emitting control circuit, and the energy storage circuit is configured to store electric energy. One end of the first switch circuit is in electrical connection with the control end of the light-emitting control circuit, and the other end of the first switch circuit is in electrical connection with an input of the light-emitting control circuit. One end of the second switch circuit is in electrical connection with an output of the data input circuit, and the other end of the second switch circuit is grounded. The input of the light-emitting control circuit is in electrical connection with a first power supply, an output of the light-emitting control circuit is in electrical connection with an anode of a light-emitting device through the third switch circuit, and the light-emitting control circuit is configured to output the driving current to the light-emitting device in a light-emitting phase. A cathode of the light-emitting device is in electrical connection with a second power supply. The first switch circuit and the second switch circuit are switched on in the reset phase, and are switched off in the writing phase and the light-emitting phase. The third switch circuit is switched off in the reset phase and the writing phase, and is switched on in the light-emitting phase. In the above technical solutions, in the reset phase, the first switch circuit and the second switch circuit are switched on, a path is formed among the first power supply, the first switch circuit, the energy storage circuit and the second switch circuit, the energy storage circuit is charged, and a voltage at the control end of the light-emitting control circuit is boosted to the voltage of the first power supply, which can reduce a voltage difference between the control end and the input of the light-emitting control circuit (that is, the gate and source of the drive thin-film transistor), thereby reducing the probability of afterimages on the display screen caused by the parasitic capacitance between the control end and the input of the light-emitting control circuit. In the writing phase, the energy storage circuit is charged by the data input circuit, and the voltage at the control end of the light-emitting control circuit is boosted to a sum of the data voltage and the voltage of the first power supply, in this way, in the light-emitting phase, the driving current of the light-emitting device is enabled to be controlled according to the data voltage, so that the driving current of the light-emitting device is independent from the voltage of the first power supply, thereby reducing the difference in the driving current of each OLED caused by the distance difference between the power supply and each OLED, which thus can improve the uniformity of the brightness of the display screen.

In the above embodiments, the descriptions of each embodiment have their own emphases, and for parts that are not detailed or recorded in a certain embodiment, references may be made to the relevant descriptions of other embodiments.

It should be understood that the term “comprising”, when used in the specification and claims of the present application, indicates a presence of described features, integers, steps, operations, elements and/or components, but does not exclude the presence or addition of one or more other features, wholes, steps, operations, elements, components and/or combinations thereof.

The naming or numbering of the steps in the present application does not mean that the steps in the method flow must be executed in the time/logic sequence indicated by the naming or numbering. The order of execution for the named or numbered process steps can be changed based on the technical objectives to be achieved, as long as the same or similar technical effect can be achieved.

In the embodiments provided by the present application, it should be understood that the disclosed device/equipment may be implemented in other ways. For example, the device/device embodiments described above are only illustrative. For example, the division of the modules or units is only a logical function division. In actual implementation, there may be other division methods, such as multiple units or components may be combined or integrated into another system, or some features may be omitted, or not implemented. Furthermore, the mutual coupling or direct coupling or communication connection shown or discussed may be an indirect coupling or communication connection through some interfaces, devices or units, may also be electrical, mechanical or other forms.

In the description of the present application, unless otherwise specified, “/” means that the objects associated with each other are an “or” relationship, for example, A/B may mean A or B. the expression “and/or” in the present application is only an association relationship describing associated objects, which means that three kinds of relationships may be included, for example, A and/or B, may include three cases, that is, A exists alone, both A and B exist, and B exists alone, among which A, B C may be singular or plural.

In addition, in the description of the present application, unless otherwise specified, the phrase "a plurality of" means two or more than two. "at least one of" the following" or similar expressions refer to any combination of these items, including any combination of single items or plural items. For example, at least one of a, b, or c may include that: a, b, c, a-b, a-c, b-c, or a-b-c, wherein a, b, c may be singular or plural.

As used in the specification and the appended claims of the present application, the term if may be construed, depending on the context, as "when" or "once" or "in response to determining" or "in response to detecting". Similarly, the phrase "if determined" or "if [the described condition or event] is detected" may be construed, depending on the context, to mean "once determined" or "in response to the determination" or "once detected [the described condition or event]" or "in response to detection of [described condition or event]".

In addition, in the description of the specification and the appended claims of the present application, the terms "first", "second", "third" and so on are used to distinguish similar objects, and are not necessarily used to describe a specific order or sequence order. It should be understood that the terms so used are interchangeable under appropriate circumstances such that the embodiments described herein can be practiced in sequences other than those illustrated or described herein.

References to "one embodiment" or "some embodiments" or the like described in the specification of the present application mean that a particular feature, structure or characteristic described in connection with that embodiment is included in one or more embodiments of the present application. Thus, appearances of the phrases "in one embodiment," "in some embodiments," "in other embodiments," "in some other embodiments," etc. in various places in this specification are not necessarily all refer to the same embodiment, but mean "one or more but not all embodiments" unless specifically stated otherwise.

Finally, it should be noted that: the above embodiments are only used to illustrate the technical solutions of the present application, and are not intended to limit it. Although the present application has been described in detail with reference to the foregoing embodiments, those of ordinary skills in the art should understand that the technical solutions described in the foregoing embodiments may still be modified, or some or all of the technical features thereof may be equivalently replaced; and these modifications or replacements do not make the essence of the corresponding technical solutions deviate from the scope pf the technical solutions of the various embodiments of the present application.

What is claimed is:

1. A pixel drive circuit, comprising:

a data input circuit, an energy storage circuit, a light-emitting control circuit, a first switch circuit, a second switch circuit, and a third switch circuit;

wherein, the data input circuit is in electrical connection with a control end of the light-emitting control circuit through the energy storage circuit, the data input circuit is configured to output a data voltage to the light-emitting control circuit, the energy storage circuit is configured to store electric energy, and the energy storage circuit comprises a capacitor;

an end of the first switch circuit is in electrical connection with the control end of the light-emitting control circuit, and another end of the first switch circuit is in electrical connection with an input of the light-emitting control circuit;

an end of the second switch circuit is in electrical connection with an output of the data input circuit, and another end of the second switch circuit is grounded;

the input of the light-emitting control circuit is in electrical connection with a first power supply, an output of the light-emitting control circuit is in electrical connection with an anode of a light-emitting device through the third switch circuit, the light-emitting control circuit is configured to output a driving current to the light-emitting device, and the driving current is independent from the capacitor;

a cathode of the light-emitting device is in electrical connection with a second power supply;

the first switch circuit and the second switch circuit are switched on in a reset phase, and are switched off in a writing phase and a light-emitting phase; and the third switch circuit is switched off in the reset phase and the writing phase, and is switched on in the light-emitting phase; and wherein the pixel drive circuit further comprises: a fourth switch circuit, and the first switch circuit and the light-emitting control circuit are in electrical connection with the first power supply through the fourth switch circuit.

2. The pixel drive circuit according to claim 1, wherein the first switch circuit comprises a first switch and a first scan line, a first electrode of the first switch is in electrical connection with the control end of the light-emitting control circuit, a second electrode of the first switch is in electrical connection with the input of the light-emitting control circuit, and a control electrode of the first switch is in electrical connection with an output of the first scan line.

3. The pixel drive circuit according to claim 2, wherein the first switch is a P-channel metal oxide semiconductor (PMOS) transistor, and the first scan line outputs a low-potential signal in the reset phase and outputs a high-potential signal in the write phase and the light-emitting phase.

4. The pixel drive circuit according to claim 1, wherein the second switch circuit comprises a second switch and a second scan line, a first electrode of the second switch is in electrical connection with the output of the data input circuit, a second electrode of the second switch is grounded, and a control electrode of the second switch is in electrical connection with an output of the second scan line.

5. The pixel drive circuit according to claim 1, wherein the third switch circuit comprises a third switch and a light-emitting signal line, a first electrode of the third switch is in electrical connection with the output of the light-emitting control circuit, a second electrode of the third switch is in electrical connection with the anode of the light-emitting device, and a control electrode of the third switch is in electrical connection with an output of the light-emitting signal line.

6. The pixel drive circuit according to claim 1, wherein the fourth switch circuit comprises a fourth switch and a third scan line, a first electrode of the fourth switch is in electrical connection with the first power supply, a second electrode of the fourth switch is in electrical connection with the input of the light-emitting control circuit, and a control electrode of the fourth switch is in electrical connection with an output of the third scan line.

7. The pixel drive circuit according to claim 1, wherein the data input circuit comprises a fifth switch, a data line, and a fourth scan line, a first electrode of the fifth switch is in electrical connection with an output of the data line, a second electrode of the fifth switch is in electrical connection with the control end of the light-emitting control circuit through the energy storage circuit, and a control electrode of the fifth switch is in electrical connection with an output of the fourth scan line.

8. A display panel, comprising:

a plurality of pixel units, each pixel unit comprising:

a light-emitting device; and a pixel drive circuit, comprising: a data input circuit, an energy storage circuit, a light-emitting control circuit, a first switch circuit, a second switch circuit, and a third switch circuit;

wherein the data input circuit is in electrical connection with a control end of the light-emitting control circuit through the energy storage circuit, the data input circuit is configured to output a data voltage to the light-emitting control circuit, the energy storage circuit is configured to store electric energy, and the energy storage circuit comprises a capacitor;

an end of the first switch circuit is in electrical connection with the control end of the light-emitting control circuit, and another end of the first switch circuit is in electrical connection with an input of the light-emitting control circuit;

an end of the second switch circuit is in electrical connection with an output of the data input circuit, and another end of the second switch circuit is grounded;

the input of the light-emitting control circuit is in electrical connection with a first power supply, an output of the light-emitting control circuit is in electrical connection with an anode of the light-emitting device through the third switch circuit, the light-emitting control circuit is configured to output a driving current to the light-emitting device, and the driving current is independent from the capacitor;

a cathode of the light-emitting device is in electrical connection with a second power supply;

the first switch circuit and the second switch circuit are switched on in a reset phase, and are switched off in a writing phase and a light-emitting phase; and the third switch circuit is switched off in the reset phase and the writing phase, and is switched on in the light-emitting phase; and wherein the pixel drive circuit further comprises: a fourth switch circuit, and the first switch circuit and the light-emitting control circuit are in electrical connection with the first power supply through the fourth switch circuit.

9. The display panel according to claim 8, wherein the first switch circuit comprises a first switch and a first scan line, a first electrode of the first switch is in electrical connection with the control end of the light-emitting control circuit, a second electrode of the first switch is in electrical connection with the input of the light-emitting control circuit, and a control electrode of the first switch is in electrical connection with an output of the first scan line.

10. The display panel according to claim 9, wherein the first switch is a PMOS transistor, and the first scan line outputs a low-potential signal in the reset phase and outputs a high-potential signal in the write phase and the light-emitting phase.

11. The display panel according to claim 8, wherein the second switch circuit comprises a second switch and a second scan line, a first electrode of the second switch is in electrical connection with the output of the data input circuit, a second electrode of the second switch is grounded, and a control electrode of the second switch is in electrical connection with an output of the second scan line.

12. The display panel according to claim 8, wherein the third switch circuit comprises a third switch and a light-emitting signal line, a first electrode of the third switch is in electrical connection with the output of the light-emitting control circuit, a second electrode of the third switch is in electrical connection with the anode of the light-emitting device, and a control electrode of the third switch is in electrical connection with an output of the light-emitting signal line.

13. The display panel according to claim 8, wherein the fourth switch circuit comprises a fourth switch and a third scan line, a first electrode of the fourth switch is in electrical connection with the first power supply, a second electrode of the fourth switch is in electrical connection with the input of the light-emitting control circuit, and a control electrode of the fourth switch is in electrical connection with an output of the third scan line.

14. The display panel according to claim 8, wherein the data input circuit comprises a fifth switch, a data line, and a fourth scan line, a first electrode of the fifth switch is in electrical connection with an output of the data line, a second electrode of the fifth switch is in electrical connection with the control end of the light-emitting control circuit through the energy storage circuit, and a control electrode of the fifth switch is in electrical connection with an output of the fourth scan line.

* * * * *